United States Patent [19]

Marumoto

[11] Patent Number: 5,583,515
[45] Date of Patent: Dec. 10, 1996

[54] CROSS POLARIZATION COMPENSATION FOR ZERO VECTOR COMMUNICATION SIGNALS

[75] Inventor: Tsunehisa Marumoto, Tokyo, Japan

[73] Assignee: NEC Corporation, Japan

[21] Appl. No.: 331,804

[22] Filed: Oct. 31, 1994

[30] Foreign Application Priority Data

Oct. 29, 1993 [JP] Japan .................................. 5-293981

[51] Int. Cl.⁶ ............................. H01Q 21/06; H04B 1/10
[52] U.S. Cl. ......................... 342/361; 455/63; 455/295; 455/296
[58] Field of Search .................................. 342/361–366; 455/60, 63, 295, 296

[56] References Cited

U.S. PATENT DOCUMENTS

| | | | |
|---|---|---|---|
| 4,090,137 | 5/1978 | Soma et al. | 455/60 |
| 4,233,576 | 11/1980 | Pelchat | 333/16 |
| 4,310,813 | 1/1982 | Yuuki et al. | 455/63 |

FOREIGN PATENT DOCUMENTS

| | | |
|---|---|---|
| 348940 | 6/1989 | European Pat. Off. . |
| 1504899 | 8/1975 | United Kingdom . |
| 1506889 | 9/1975 | United Kingdom . |

OTHER PUBLICATIONS

Williams, "A Dual Polarized 4/6 GHz Adaptive Polarization Control Network" Comsat Tech. Rev. (USA) S 7461–01292, vol. 7, No. 1, Spring 1977.

Persinger, R. R., *IEE Conference Publication*, "Operational Measurements of A 4/6–GHz Adaptive Polarization Compensation Network Employing Up/Down Correlation Algorithms," Apr. 1981, pp. 181–187.

*Primary Examiner*—Gregory C. Issing
*Attorney, Agent, or Firm*—Ostrolenk, Faber, Gerb & Soffen, LLP

[57] ABSTRACT

In an earth station terminal, a cascaded arrangement of downlink half- and quarter-wave polarizers receives a downlink communication signal and a mono-polarized beacon signal from a communications satellite and separates the communication signal into respective polarization components. A receiver is connected to the cascaded polarizers for detecting the in-phase and orthogonal-phase components of a cross-polarization of the beacon signal with respect to the phase of its copolarization. For cross polarization compensation, first and second polarization offset values of the beacon signal are derived from the angular positions of the polarizers, and subtracted from the beacon's in-phase and orthogonal-phase components, respectively, to produce target values. By controlling the polarizers until their angular positions are respectively equal to the target values, the polarization components of the downlink communication signal assume zero vectors.

11 Claims, 3 Drawing Sheets

CROSS POLARIZATION COMPENSATION FOR ZERO VECTOR COMMUNICATION SIGNALS

BACKGROUND OF THE INVENTION

1. Field of the Invention

The present invention relates generally to satellite communications systems, and more specifically to a cross polarization compensation technique.

2. Description of the Related Art

Orthogonal circular or linear polarization is employed for transmission on satellite links to increase communication capacity. For reception, half and quarter wavelength polarizers are used for separating the received signal into respective polarization components. The discrimination between the polarization components, known as cross polarization discrimination (XPD), is an important consideration as a measure of isolation. However, the XPD value degrades if the satellite links are affected by rainfalls. Cross polarization compensation is required to maintain desired isolation using a mono-polarized downlink beacon, as discussed in "Operational Measurements of a 4/6-GHz Adaptive Polarization Compensation Network Employing Up/Down-Link Correlation Algorithms", R. R. Persinger, et al, IEE Second International Conference on Antenna and Propagation, April 1981, IEE Conference Publication. According to this prior art, the beacon signal is used as error vectors ($E_x$, $E_y$) to control the downlink half and quarter wavelength polarizers so that the error vectors of the beacon are reduced to zero. On the other hand, both of the received downlink communication and beacon signals are affected by a combined effect of satellite-induced depolarization (or offset) and medium-induced depolarization. Since the mono-polarized beacon has, under certain conditions, a very low XPD value in comparison with that of the downlink communication signal, controlling the polarizers to reduce the beacon's vectors to zero not only compensates for the medium-induced depolarization, but the satellite-induced depolarization. As a result, the in-phase and orthogonal-phase vectors ($E_{xd}$, $E_{yd}$) of a cross-polarization of the downlink communication signal with respect to the phase of its copolarization (downlink's main signal which is either clockwise or counterclockwise polarized) are not reduced to zero as shown in FIG. 1 (in which the absolute value of each vector represents the amplitude ratio of the main to orthogonal components of each of the clockwise and counterclockwise polarizations and the angle of each vector indicates the phase difference between such components), while the in-phase and orthogonal-phase vectors ($E_x$, $E_y$) of a cross-polarization of the beacon signal with respect to the phase of its copolarization (the beacon's main signal) reduces to zero. Because of the correlation between uplink and downlink signals, the in-phase and orthogonal-phase vectors ($E_{xu}$, $E_{yu}$) of a cross-polarization of the uplink communication signal with respect to the phase of its copolarization are not reduced to zero as indicated in FIG. 1.

SUMMARY OF THE INVENTION

It is therefore an object of the present invention to provide cross polarization compensation by providing compensation for medium-induced depolarization by excluding the effect of satellite-induced depolarization.

According to the present invention, there is provided an earth station terminal for a satellite communications system wherein the satellite transmits dual polarized downlink communication signals and a mono-polarized beacon signal. The terminal comprises an antenna for providing communication with the satellite, a diplexer connected to the antenna, a downlink cascaded arrangement for receiving a downlink communication signal and the beacon signal via the diplexer, the downlink cascaded arrangement including a half wavelength polarizer and a quarter wavelength polarizer for separating the downlink communication signal into polarization components, first and second downlink actuators for respectively driving the half and quarter wavelength polarizers to determine their angular positions, and downlink angular position detectors for producing first and second downlink angular position signals respectively representing the angular positions of the half and quarter wavelength polarizers. A receiver is connected to the downlink cascaded arrangement for detecting the beacon signal and producing a pair of signals $E_x$ and $E_y$ respectively representing the in-phase and orthogonal-phase components of a cross-polarization of the beacon signal, which in-phase component is in phase with the copolarization of the beacon signal and which orthogonal-phase component has an orthogonal phase relation to the copolarization of the beacon signal. A polarization compensation controller derives first and second polarization offset values of the beacon signal from the first and second downlink angular position signals, subtracts the first and second offset values from the in-phase and orthogonal-phase components of the beacon signal, respectively, to produce first and second downlink target values, and controls the first and second downlink actuators until the first and second downlink angular position signals are respectively equal to the first and second downlink target values so that the polarization components of the downlink communication signal have zero vectors.

The first and second offset values are respectively represented by:

$$E_0 \cos(\beta_0 + 2\theta_{hd} - 4\theta_{qd})$$

$$E_0 \sin(\beta_0 + 2\theta_{hd} - 4\theta_{qd})$$

where, $E_0$ is the magnitude of the beacon signal during periods of clear weather, $\beta_0$ is the tilt angle of the polarization of the beacon signal during periods of clear weather, and $\theta_{hd}$, $\theta_{qd}$ represent the first and second downlink angular position signals, respectively.

The earth station terminal further comprises an uplink cascaded arrangement of a half wavelength polarizer and a quarter wavelength polarizer for applying polarized uplink signals through the half and quarter wavelength polarizers of the uplink cascaded arrangement to the diplexer, first and second uplink actuators for respectively driving the half and quarter wavelength polarizers of the uplink cascaded arrangement to determine their angular positions, and uplink angular position detectors for producing first and second uplink angular position signals respectively representing the angular positions of the half and quarter wavelength polarizers of the uplink cascaded arrangement. The polarization compensation controller further produces first and second uplink target values in accordance with the first and second downlink angular position signals and controls the first and second uplink actuators until the first and second uplink angular position signals are respectively equal to the first and second uplink target values.

BRIEF DESCRIPTION OF THE DRAWINGS

The present invention will be described in further detail with reference to the accompanying drawings, in which.

DETAILED DESCRIPTION

Figure 2:
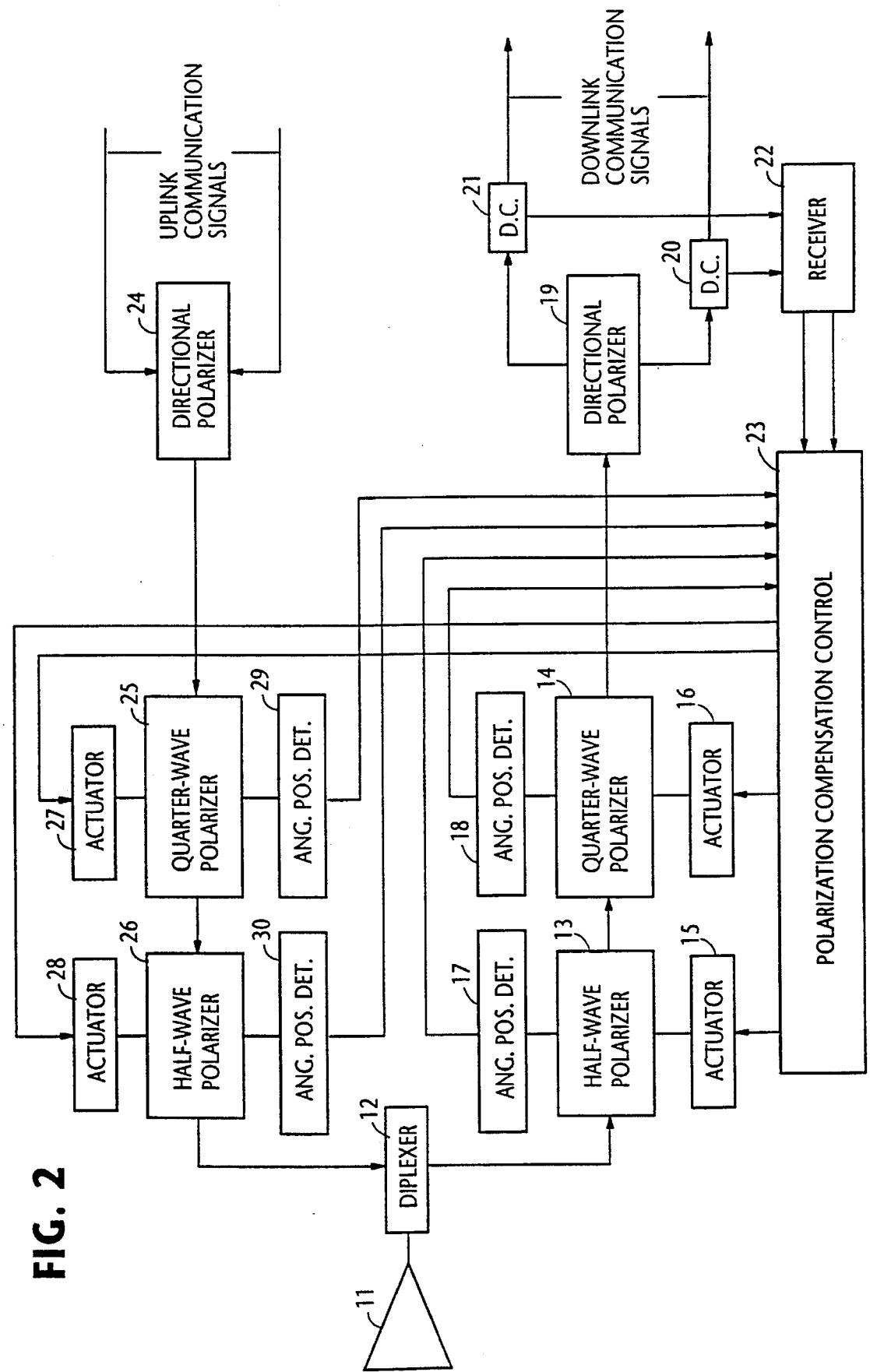
FIG. 2 is a block diagram of an earth station terminal of the present invention for satellite communications systems.

In FIG. 2, a satellite communications terminal according to the present invention includes an antenna 11 for receiving circularly dual polarized downlink signals from a communications satellite and transmitting circularly dual polarized uplink signals to the satellite. The received downlink signal is coupled via a diplexer 12 to a cascaded arrangement of a half wavelength polarizer 13 and a quarter wavelength polarizer 14 which is connected to a polarization coupler 19. The downlink polarizers 13 and 14 are respectively driven by downlink actuators 15 and 16, which are in turn controlled by a polarization compensation controller 23. Downlink angular position detectors 17 and 18 are connected to the downlink half and quarter wavelength polarizers 13 and 14, respectively, to detect their actual angular positions $\theta_{hd}$ and $\theta_{qd}$. The clockwise and counterclockwise components of the received circular-polarized wave are separated by the polarization coupler 19 and supplied respectively to directional couplers 20 and 21 for application to the next stage of the terminal's downlink system.

A beacon receiver 22 is connected to the directional couplers 20 and 21 for detecting a linear mono-polarized beacon signal (non-modulated carrier) transmitted with the downlink communication signal. Although the beacon is a mono-polarized signal, it is converted to a signal having an in-phase component and an orthogonal-phase component after passing through the half and quarter wavelength polarizers 13 and 14. Accordingly, the beacon receiver 22 produces vectors $E_x$ and $E_y$ respectively representing the in-phase and orthogonal-phase components of a cross-polarization of the beacon signal with respect to the phase of its copolarization (main component).

The uplink system of the satellite terminal includes a polarization coupler 24 which provides coupling of circularly dual polarized uplink signals to a cascaded arrangement of a quarter wavelength polarizer 25 and a half wavelength polarizer 26, the output of the cascaded arrangement being connected through diplexer 12 to antenna 11. The uplink polarizers 25 and 26 are respectively driven by uplink actuators 27 and 28, which are controlled by controller 23. Uplink angular position detectors 29 and 30 are connected to the uplink polarizers 25 and 26, respectively, to detect their actual angular positions $\theta_{hu}$ and $\theta_{qu}$.

Controller 23 is supplied with the downlink angular position data $\theta_{hd}$ and $\theta_{qd}$ from the downlink angular position detectors 17 and 18 and the vectors $E_x$ and $E_y$ from the beacon receiver 22 to calculate angular position errors $\Delta\theta_{hd}$ and $\Delta\theta_{qd}$ according to the following algorithm and controls the actuators 17 and 18 with the calculated errors.

In practice, the received mono-polarized beacon signal is somewhat offset from the true linear polarization and exhibits some ellipticity due to the tolerances of the satellite beacon transmitter, i.e., satellite-induced depolarization. By representing the angular positions of the downlink polarizers as $\theta'_{hd}$ and $\theta'_{qd}$, respectively, when the downlink communication signal has zero vectors $E_{xd}=0$, $E_{yd}=0$ respectively for the in-phase and orthogonal-phase components of a cross-polarization of the downlink communication signal with respect to the phase of its copolarization (either clockwise or counterclockwise polarized) during periods of clear weather, the following relations exist:

$$\theta'_{hd} = F_h(E_x, E_y, \theta_{hd}, \theta_{qd}, e_0, \beta_0) \quad (1a)$$

$$\theta'_{qd} = F_q(E_x, E_y, \theta_{hd}, \theta_{qd}, e_0, \beta_0) \quad (1b)$$

where, $e_0$ is the axial ratio of the elliptically offset beacon signal in a fair weather condition and $\beta_0$ is the tilt angle of the elliptical polarization of the beacon signal during clear weather periods. Error angles $\Delta\theta_{hd}$ and $\Delta\theta_{qd}$ of the respective downlink polarizers are therefore given by:

$$\begin{aligned} \Delta\theta_{hd} &= \theta'_{hd} - \theta_{hd} \\ &= F_h(E_x, E_y, \theta_{hd}, \theta_{qd}, e_0, \beta_0) - \theta_{hd} \end{aligned} \quad (2a)$$

$$\begin{aligned} \Delta\theta_{qd} &= \theta'_{qd} - \theta_{qd} \\ &= F_q(E_x, E_y, \theta_{hd}, \theta_{qd}, e_0, \beta_0) - \theta_{qd} \end{aligned} \quad (2b)$$

By controlling the downlink attenuators 15 and 16 in accordance with the error angles, the magnitudes of the in-phase and orthogonal-phase component vectors $E_{xd}$, $E_{yd}$ of the cross-polarization of the downlink communication signal are maintained at zero under varying rainfall conditions.

To reduce the computational burden of controller 23, the error angles are not directly calculated, but the following algorithm is used instead.

By representing the in-phase and orthogonal-phase vectors of a cross-polarization of the elliptically offset beacon signal as $E'_x$ and $E'_y$ with respect to the phase of its copolarization when the communication signal has zero vectors $E_{xd}=0$, $E_{yd}=0$, the following relations are obtained:

$$E'_x = E_0 \cos(\beta_0 + 2\theta'_{hd} - 4\theta'_{qd}) \quad (3a)$$

$$E'_y = E_0 \sin(\beta_0 + 2\theta'_{hd} - 4\theta'_{qd}) \quad (3b)$$

$$E_0 = (e_0 - 1)/(e_0 + 1) \quad (3c)$$

where, $E_0$ is the magnitude of the beacon signal during periods of clear weather.

Differently stated, if conditions $E_{xd}=0$ and $E_{yd}=0$ exist, then the relations $\theta_{hd}=\theta'_{hd}$, $\theta_{qd}=\theta'_{qd}$, $E_x=E'_x$ and $E_y=E'_y$ can be established under necessary and sufficient conditions as follows:

$$[E_{xd}=0, E_{yd}=0] \iff [\theta_{hd}=\theta'_{hd}, \theta_{qd}=\theta'_{qd}] \quad (4)$$
$$\iff [E_x=E'_x, E_y=E'_y]$$

where, the symbol $\iff$ denotes the necessary and sufficient conditions.

In order to represent the beacon's polarization offset due to the satellite-induced depolarization and to eliminate this offset, offset vectors $E_{xo}$ and $E_{yo}$ which are given by the following relations are considered for the beacon signal:

$$E_{xo} = E_0 \cos(\beta_0 + 2\theta_{hd} - 4\theta_{qd}) \quad (5a)$$

$$E_{yo} = E_0 \sin(\beta_0 + 2\theta_{hd} - 4\theta_{qd}) \quad (5b)$$

If the following conditions are established:

$$[\theta_{hd}=\theta'_{hd}, \theta_{qd}=\theta'_{qd}] \iff [E_{xo}=E'x, E_{yo}=E'y] \quad (6)$$

then the following relations hold:

$$[E_x=E_{xo}, E_y=E_{yo}] \iff [E_{xd}=0, E_{yd}=0] \quad (7)$$

If downlink actuators 15 and 16 are controlled such that the conditions Ex=$E_{xo}$ and Ey=$E_{yo}$ are established, then there is no need to provide direct calculation of the angles $\theta'_{hd}$ and $\theta'_{qd}$ to obtain zero vectors $E_{xd}$=0 and $E_{yd}$=0.

On the other hand, the error angles $\Delta\theta_{hd}$ and $\Delta\theta_{qd}$ can be regarded as variables which vary as a function (Dq, Dh) of differences $E_x - E_{xo}$ and $E_y - E_{yo}$, respectively, as given by, $$\Delta\theta_{qd} = Dq(E_x - E_{xo}) \tag{8a}$$

$$\Delta\theta_{hd} = Dh(E_y - E_{yo}) \tag{8b}$$

and Equations (8a), (8b) can be approximated by:

$$\Delta\theta_{qd} = d_q \cdot (E_x - E_{xo}) \tag{9a}$$

$$\Delta\theta_{hd} = d_h \cdot (E_y - E_{yo}) \tag{9b}$$

where $d_q$ and $d_h$ are the driving coefficients of the downlink actuators 15 and 16, respectively.

Using Equations (5a), (5b), Equations (9a), (9b) are rewritten as:

$$\Delta\theta_{qd} = d_q \cdot \{E_x - E_0 \cos(\beta_0 + 2\theta_{hd} - 4\theta_{qd})\} \tag{10a}$$

$$\Delta\theta_{hd} = d_h \cdot \{E_y - E_0 \sin(\beta_0 + 2\theta_{hd} - 4\theta_{qd})\} \tag{10b}$$

The error angles $\Delta\theta_{hd}$ and $\Delta\theta_{qd}$ are summed with the outputs of the angular position detectors 17 and 18 to generate angular position control signals $H_d$ and $Q_d$ as follows:

$$H_d = \Delta\theta_{hd} + \theta_{hd} \tag{11a}$$

$$Q_d = \Delta\theta_{qd} + \theta_{qd} \tag{11a}$$

The angular position controls $H_d$ and $Q_d$ are respectively applied to the downlink actuators 15 and 16. In this way, the zero vector conditions $E_{xd}$=0 and $E_{yd}$=0 are obtained for the downlink communication signal.

Meanwhile, the controller 23 utilizes the downlink angular position signals $\theta_{hd}$, $\theta_{qd}$ from downlink angular position detectors 16, 17 to calculate the following uplink polarization angles:

$$Q_u = \{K(-2\theta_{qd})/2\} - \pi/4 \tag{12a}$$

$$H_u = \{(Q_u + \theta_{qd})/2\} - \theta_{hd} \tag{12b}$$

where, K is a function that defines the correlation between the downlink and uplink DPS (differential phase shift) values $\phi_u$ and $\phi_d$ as follows:

$$\phi_u = K(\phi_d) \tag{13}$$

Since Equation (13) can be rewritten as:

$$\phi_u = a \cdot \phi_d + b \tag{14}$$

where a and b are DPS constants. Using Equations (13) and (14), Equations (11a) and (11b) are rewritten as:

$$Q_u = -a \cdot \theta_{qd} + b/2 \tag{15a}$$

$$H_u = \theta_{qd}(1-a)/2 + b/4 - \theta_{hd} \tag{15b}$$

In this way, the uplink polarization offset is also compensated for by controlling the uplink actuators 27 and 28 according to Equations (15a) and (15b).

In a practical embodiment, controller 23 uses a cross polarization discrimination (XPD) threshold XPDth (dB) as a reference to interrupt the tracking operation whenever the following relation is established in the downlink system:

$$(E_x - E_{xo})^2 + (E_y - E_{yo})^2 \leq 10^{-XPDth/10} \tag{16}$$

Figure 3:
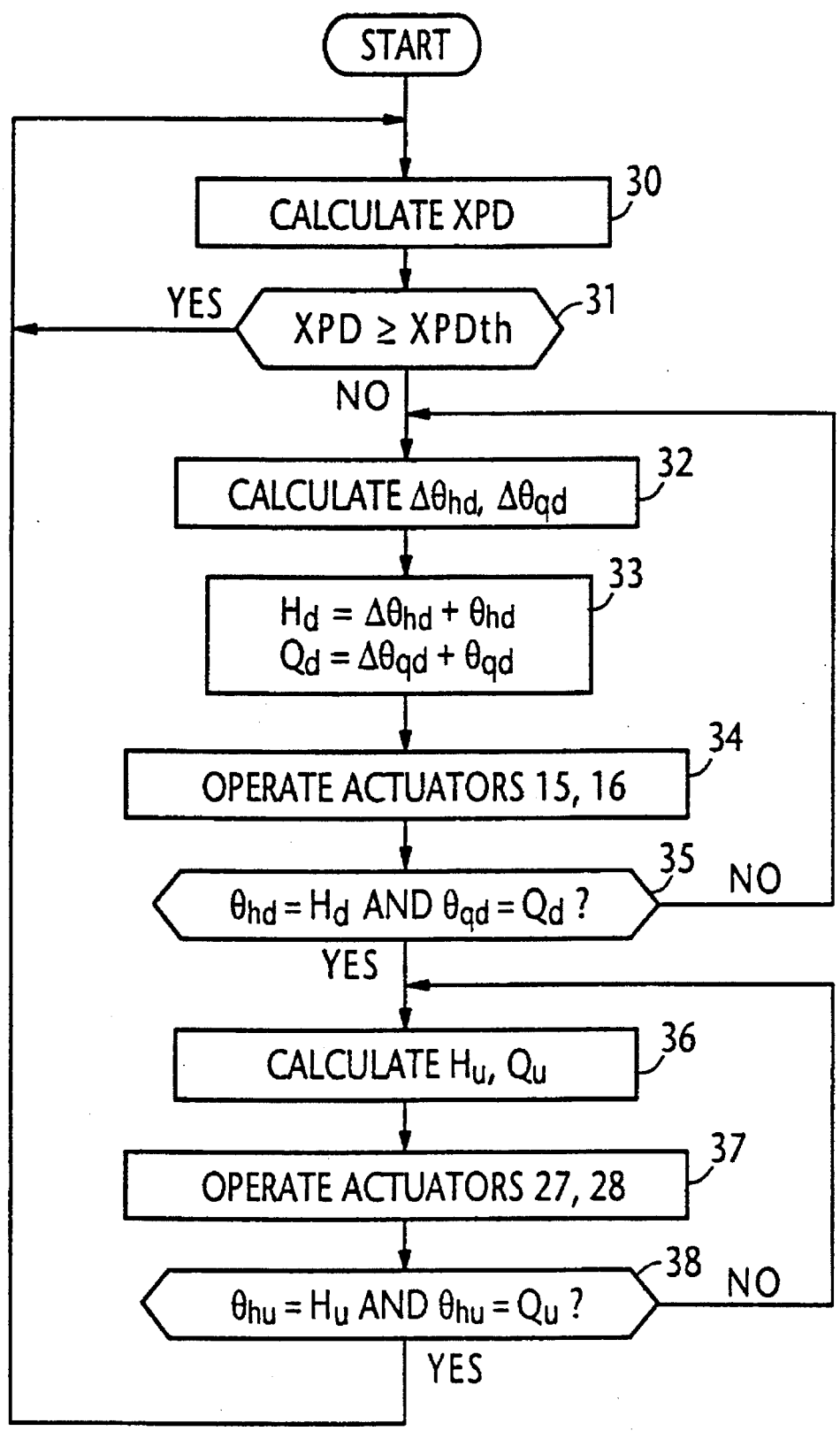
FIG. 3 is a flowchart illustrating the operation of the cross polarization controller of FIG. 2.

The operation of the controller 23 proceeds in accordance with the flowchart of FIG. 3. At step 30, controller 23 calculates the XPD value according to Equation (17) and compares it to the threshold XPDth at step 31 according to Equation (18).

$$XPD = -10 \log\{(E_x - E_{xo})^2 + (E_y - E_{yo})^2\} \tag{17}$$

$$XPD \geq XPDth \tag{18}$$

If the downlink XPD value is smaller than the threshold, control proceeds to step 32 to calculate the error angles $\Delta\theta_{hd}$ and $\Delta\theta_{qd}$ according to Equations (10a) and (10b) and produce position control signals $H_d$ and $Q_d$ by summing $\Delta\theta_{hd}$ with $\theta_{hd}$ and summing $\Delta\theta_{qd}$ with $\theta_{qd}$ at step 33. At step 34, downlink actuators 15 and 16 are operated with the control signals $H_d$ and $Q_d$, respectively. At step 35, controller 23 reads the outputs ($\theta_{hd}$, $\theta_{qd}$) of the downlink angular position detectors 17 and 18 and checks to see if they are equal to $H_d$ and $Q_d$, respectively. If the decision at step 35 is negative, control loops back to step 32 to repeat the calculations and operation of the actuators 15, 16 until the detected angular positions are equal to the respective target values $H_d$ and $Q_d$. Exit then is to step 36 to calculate the control signals $Q_u$ and $H_u$ according to Equations (15a) and (5b). At step 37, actuators 27 and 28 are operated with the control signals and the outputs ($\theta_{qu}$, $\theta_{hu}$) of uplink angular position detectors 29 and 30 are read and compared to the target values $Q_u$ and $H_u$ to determine whether they are equal to the respective target values (step 38). Steps 36 and 37 are repeated until the decision at step 38 becomes affirmative, whereupon control returns to step 30 to calculate the new XPD value for comparison with the threshold value.

Figure 4:
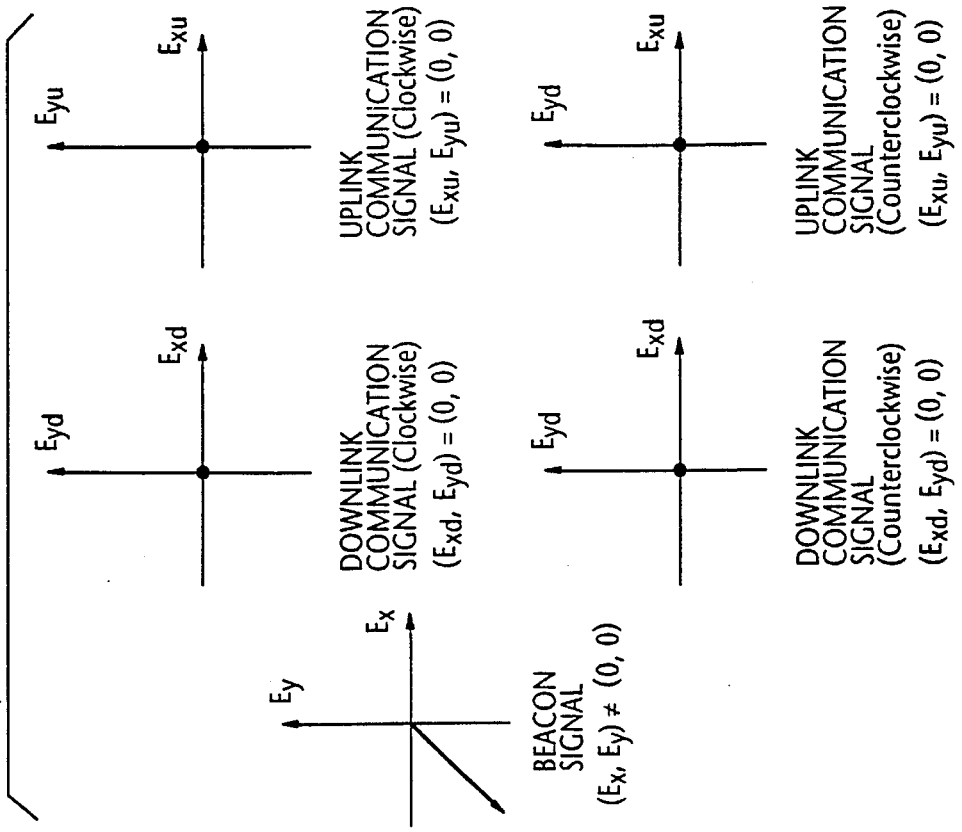
FIGS. 4 is a vector diagram illustrating the characteristics of the cross polarization compensation of the present invention.
Figure 1:
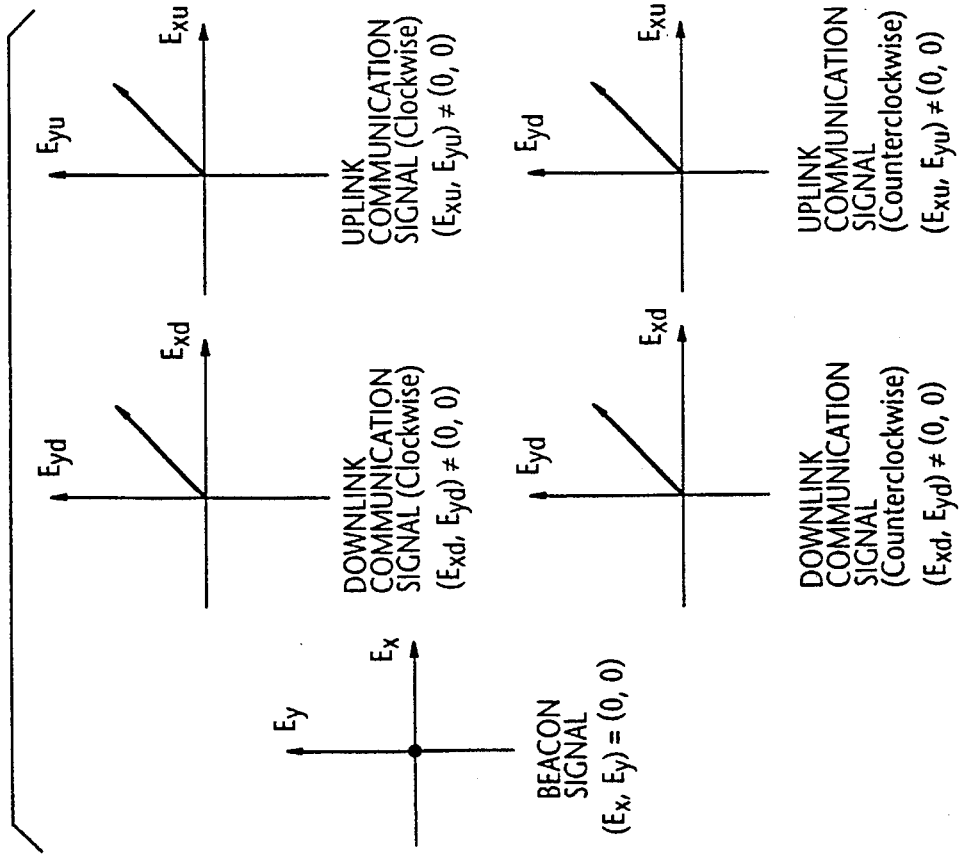
FIG. 1 is a vector diagram illustrating the shortcoming of the prior art cross polarization compensation.

As a result of the inventive cross polarization compensation, the in-phase and orthogonal-phase component vectors ($E_{xd}$, $E_{yd}$) of the cross-polarization of the downlink signal and the in-phase and orthogonal-phase component vectors ($E_{xu}$, $E_{yu}$) of a cross-polarization of the uplink signal with respect to the phase of its copolarization are all reduced to zero, while the beacon's in-phase and orthogonal-phase component vectors ($E_x$, $E_y$) are not reduced to zero, as shown in FIG. 4.

What is claimed is:

1. An earth station terminal for a satellite communications system wherein the satellite transmits dual polarized downlink communication signals and a mono-polarized beacon signal, the terminal comprising:

an antenna for providing communication with said satellite;

a diplexer connected to the antenna;

a downlink cascaded arrangement for receiving a downlink communication signal and the beacon signal via said diplexer, the downlink cascaded arrangement including a half wavelength polarizer and a quarter wavelength polarizer for separating the received downlink communication signal into respective polarization components;

first and second downlink actuators for respectively driving said half and quarter wavelength polarizers to determine the angular positions thereof;

downlink angular position detectors for producing first and second downlink angular position signals respectively representing the angular positions of said half and quarter wavelength polarizers;

means connected to said downlink cascaded arrangement for detecting said beacon signal and producing in-phase and orthogonal-phase components of a cross-polarization of the beacon signal with respect to a copolarization of the beacon signal; and control means for deriving first and second polarization offset values of said beacon signal from said first and second downlink angular position signals, subtracting the first and second offset values from said in-phase and orthogonal-phase components, respectively, to produce first and second downlink target values, and controlling said first and second downlink actuators until the first and second downlink angular position signals are respectively equal to the first and second downlink target values so that the polarization components of said downlink communication signal have zero vectors.

2. An earth station terminal as claimed in claim 1, wherein said first and second offset values are respectively represented by:

$$E_0 \cos (\beta_0 + 2\theta_{hd} - 4\theta_{qd})$$

$$E_0 \sin (\beta_0 + 2\theta_{hd} - 4\theta_{qd})$$

where, $E_0$ is the magnitude of said cross-polarization of said beacon signal during periods of clear weather, $\beta_0$ is the tilt angle of elliptical polarization of said beacon signal during periods of clear weather, and $\theta_{hd}$, $\theta_{qd}$ represent said first and second downlink angular position signals, respectively.

3. An earth station terminal as claimed in claim 1, further comprising:

an uplink cascaded arrangement of a half wavelength polarizer and a quarter wavelength polarizer for applying a polarized uplink signal through the half and quarter wavelength polarizers of the uplink cascaded arrangement to said diplexer;

first and second uplink actuators for respectively driving said half and quarter wavelength polarizers of the uplink cascaded arrangement to determine the angular positions thereof; and uplink angular position detectors for producing first and second uplink angular position signals respectively representing the angular positions of said half and quarter wavelength polarizers of the uplink cascaded arrangement;

said control means further producing first and second uplink target values in accordance with said first and second downlink angular position signals and controlling said first and second uplink actuators until the first and second uplink angular position signals are respectively equal to the first and second uplink target values.

4. An earth station terminal as claimed in claim 3, wherein said controller includes means for producing a cross polarization discrimination (XPD) value in accordance with the first and second downlink angular position signals and said in-phase and orthogonal-phase components of the beacon signal, comparing the XPD value with a threshold value and stopping said first and second downlink actuators and said first and second uplink actuators when the XPD value is greater than the threshold value.

5. An earth station terminal for a satellite communications system wherein the satellite transmits dual polarized downlink communication signals and a mono-polarized beacon signal, the terminal comprising:

an antenna for providing communication with said satellite;

a diplexer connected to the antenna;

a downlink cascaded arrangement for receiving a downlink communication signal and the beacon signal via said diplexer, the downlink cascaded arrangement including a half wavelength polarizer and a quarter wavelength polarizer for separating the received downlink communication signal into respective polarization components;

first and second downlink actuators for respectively driving said half and quarter wavelength polarizers to determine the angular positions thereof;

downlink angular position detectors for producing first and second angular position signals $\theta_{hd}$ and $\theta_{qd}$ respectively representing the angular positions of said half and quarter wavelength polarizers;

means connected to said downlink cascaded arrangement for detecting said beacon signal and producing an in-phase component $E_x$ and an orthogonal-phase component $E_y$ of a cross-polarization of the beacon signal with respect to the phase of a copolarization of the beacon signal; and control means for producing a first target value $\theta_{hd} + \Delta\theta_{hd}$ and a second target value $\theta_{qd} + \Delta\theta_{qd}$, and controlling said first and second downlink actuators until $\theta_{hd}$ and $\theta_{qd}$ are respectively equal to the first and target values, where $\Delta\theta_{hd}$ and $\Delta\theta_{qd}$ are given by:

$$\Delta\theta_{hd} = d_h \cdot \{E_y - E_0 \sin (\beta_0 + 2\theta_{hd} - 4\theta_{qd})\}$$

$$\Delta\theta_{qd} = d_q \cdot \{E_x - E_0 \cos (\beta_0 + 2\theta_{hd} - 4\theta_{qd})\}$$

where, $d_h$ and $d_q$ are constants, $E_0$ is the magnitude of said cross-polarization of said beacon signal during periods of clear weather, and $\beta_0$ is the tilt angle of elliptical polarization of said beacon signal during clear weather periods.

6. An earth station terminal as claimed in claim 5, further comprising:

an uplink cascaded arrangement of a half wavelength polarizer and a quarter wavelength polarizer for applying a polarized uplink signal through the half and quarter wavelength polarizers of the uplink cascaded arrangement to said diplexer;

first and second uplink actuators for respectively driving said half and quarter wavelength polarizers of the uplink cascaded arrangement to determine the angular positions thereof;

uplink angular position detectors for producing first and second uplink angular position signals $\theta_{hu}$ and $\theta_{qu}$ respectively representing the angular positions of said half and quarter wavelength polarizers of the uplink cascaded arrangement;

said control means further producing first and second uplink target values in accordance with said first and second downlink angular position signals $\theta_{hd}$ and $\theta_{qd}$ and controlling said first and second uplink actuators until the first and second uplink angular position signals are respectively equal to the first and second uplink target values.

7. An earth station terminal as claimed in claim 6, wherein said controller includes means for calculating a cross polarization discrimination (XPD) value, comparing the XPD value with a threshold value and stopping said first and second downlink actuators and said first and second uplink actuators when the XPD value is greater than the threshold value, where the XPD value is represented by:

$$XPD = -10 \log\{(E_x - E_{xo})^2 + (E_y - E_{yo})^2\}$$

where $E_{xo}$ and $E_{yo}$ are given by:

$$E_{xo} = E_0 \cos (\beta_0 + 2\theta_{hd} - 4\theta_{qd})$$

$E_{yo}=E_0 \sin(\beta_0+2\theta_{hd}-4\theta_{qd})$.

8. In an earth station terminal for a satellite communications system wherein the satellite transmits dual polarized downlink communication signals and a mono-polarized beacon signal, the terminal comprising:

an antenna for providing communication with said satellite;

a diplexer connected to the antenna;

a downlink cascaded arrangement for receiving a downlink communication signal and the beacon signal via said diplexer, the downlink cascaded arrangement including a half wavelength polarizer and a quarter wavelength polarizer for separating the received downlink communication signal into respective polarization components; and means connected to said downlink cascaded arrangement for detecting said beacon signal and producing in-phase and orthogonal-phase components of a cross-polarization of the beacon signal with respect to the phase of a copolarization of the beacon signal, a cross polarization compensation method comprising the steps of:

a) determining the angular positions of said half and quarter wavelength polarizers and representing the detected angular positions by first and second angular position signals;

b) deriving first and second polarization offset values of said beacon signal from said first and second downlink angular position signals;

c) subtracting the first and second offset values from said in-phase and orthogonal-phase components, respectively, to produce first and second downlink target values; and d) rotating said first and second downlink half and quarter wavelength polarizers until the angular positions thereof are respectively equal to the first and second downlink target values so that the polarization components of said downlink communication signal assume zero vectors.

9. In an earth station terminal for a satellite communications system wherein the satellite transmits dual polarized downlink communication signals and a mono-polarized beacon signal, the terminal comprising:

an antenna for providing communication with said satellite;

a diplexer connected to the antenna;

a downlink cascaded arrangement for receiving a downlink communication signal and the beacon signal via said diplexer, the downlink cascaded arrangement including a half wavelength polarizer and a quarter wavelength polarizer for separating the received downlink communication signal into respective polarization components; and means connected to said downlink cascaded arrangement for detecting said beacon signal and producing in-phase and orthogonal-phase components of the beacon signal, a cross polarization compensation method comprising the steps of:

a) determining the angular positions of said half and quarter wavelength polarizers and representing the detected positions by respective angular position signals;

b) producing a cross polarization discrimination (XPD) value in accordance with the angular position signals and said in-phase and orthogonal-phase components of the beacon signal;

c) comparing the XPD value with a threshold value;

d) repeating the steps (a) to (c) if the XPD value is greater than the threshold value;

e) if the XPD value is smaller than the threshold value, deriving first and second polarization offset values of said beacon signal from said angular position signals;

f) subtracting the first and second offset values from said in-phase and orthogonal-phase components, respectively, to produce first and second downlink target values; and g) rotating said first and second downlink half and quarter wavelength polarizers until the angular positions thereof are respectively equal to the first and second downlink target values so that the polarization components of said downlink communication signal assume zero vectors.

10. In an earth station terminal for a satellite communications system wherein the satellite transmits dual polarized downlink communication signals and a mono-polarized beacon signal, the terminal comprising:

an antenna for providing communication with said satellite;

a diplexer connected to the antenna;

a downlink cascaded arrangement for receiving a downlink communication signal and the beacon signal via said diplexer, the downlink cascaded arrangement including a half wavelength polarizer and a quarter wavelength polarizer for separating the received downlink communication signal into respective polarization components;

means connected to said downlink cascaded arrangement for detecting said beacon signal and producing an in-phase component $E_x$ and a orthogonal-phase component $E_y$ of the beacon signal, a cross polarization compensation method comprising the steps of:

a) determining the angular positions of said half and quarter wavelength polarizers and representing the detected positions as first and second angular position signals $\theta_{hd}$ and $\theta_{qd}$ respectively;

b) producing a first target value $\theta_{hd}+\Delta\theta_{hd}$ and a second target value $\theta_{qd}+\Delta\theta_{qd}$, where $\Delta\theta_{hd}$ and $\Delta\theta_{qd}$ are given by:

$\Delta\theta_{hd}=d_h\cdot\{E_y-E_0 \sin(\beta_0+2\theta_{hd}-4\theta_{qd})\}$ $\Delta\theta_{qd}=d_q\cdot\{E_x-E_0 \cos(\beta_0+2\theta_{hd}-4\theta_{qd})\}$ where, $d_h$ and $d_q$ are constants, $E_0$ is the magnitude of said cross-polarization of said beacon signal during periods of clear weather, and $\beta_0$ is the tilt angle of elliptical polarization of said beacon signal during clear weather periods; and c) rotating the half and quarter wavelength polarizers until $\theta_{hd}$ and $\theta_{qd}$ are respectively equal to the first and target values.

11. In an earth station terminal for a satellite communications system wherein the satellite transmits dual polarized downlink communication signals and a mono-polarized beacon signal, the terminal comprising:

an antenna for providing communication with said satellite;

a diplexer connected to the antenna;

a downlink cascaded arrangement for receiving a downlink communication signal and the beacon signal via said diplexer, the downlink cascaded arrangement including a half wavelength polarizer and a quarter wavelength polarizer for separating the received downlink communication signal into respective polarization components;

means connected to said downlink cascaded arrangement for detecting said beacon signal and producing an in-phase component $E_x$ and an orthogonal-phase component $E_y$ of a cross-polarization of the beacon signal with respect to the phase of a copolarization of the beacon signal, a cross polarization compensation method comprising the steps of:

a) determining the angular positions of said half and quarter wavelength polarizers and representing the detected positions as first and second angular position signals $\theta_{hd}$ and $\theta_{qd}$ respectively;

b) producing a cross polarization discrimination (XPD) value in accordance with the first and second downlink angular position signals and said in-phase and orthogonal-phase components of the beacon signal, where the XPD value is represented by:

$$XPD = -10 \log\{(E_x - E_{xo})^2 + (E_y - E_{yo})^2\}$$

where $E_{xo}$ and $E_{yo}$ are given by:

$$E_{xo} = E_0 \cos(\beta_0 + 2\theta_{hd} - 4\theta_{qd})$$

$$E_{yo} = E_0 \sin(\beta_0 + 2\theta_{hd} - 4\theta_{qd})$$

where, $E_0$ is the magnitude of said cross-polarization of said beacon signal during periods of clear weather, and $\beta_0$ is the tilt angle of elliptical polarization of said beacon signal during clear weather periods;

c) comparing the XPD value with a threshold value;

d) repeating the steps (a) to (c) if the XPD value is greater than the threshold value;

e) if the XPD value is smaller than the threshold value, producing a first target value $\theta_{hd} + \Delta\theta_{hd}$ and a second target value $\theta_{qd} + \Delta\theta_{qd}$, where $\Delta\theta_{hd}$ and $\Delta\theta_{qd}$ are given by:

$$\Delta\theta_{hd} = d_h \cdot \{E_y - E_0 \sin(\beta_0 + 2\theta_{hd} - 4\theta_{qd})\}$$

$$\Delta\theta_{qd} = d_q \cdot \{E_x - E_0 \cos(\beta_0 + 2\theta_{hd} - 4\theta_{qd})\}$$

where, $d_h$ and $d_q$ are constants; and f) rotating the half and quarter wavelength polarizers until $\theta_{hd}$ and $\theta_{qd}$ are respectively equal to the first and target values.

* * * * *